Figure 1:
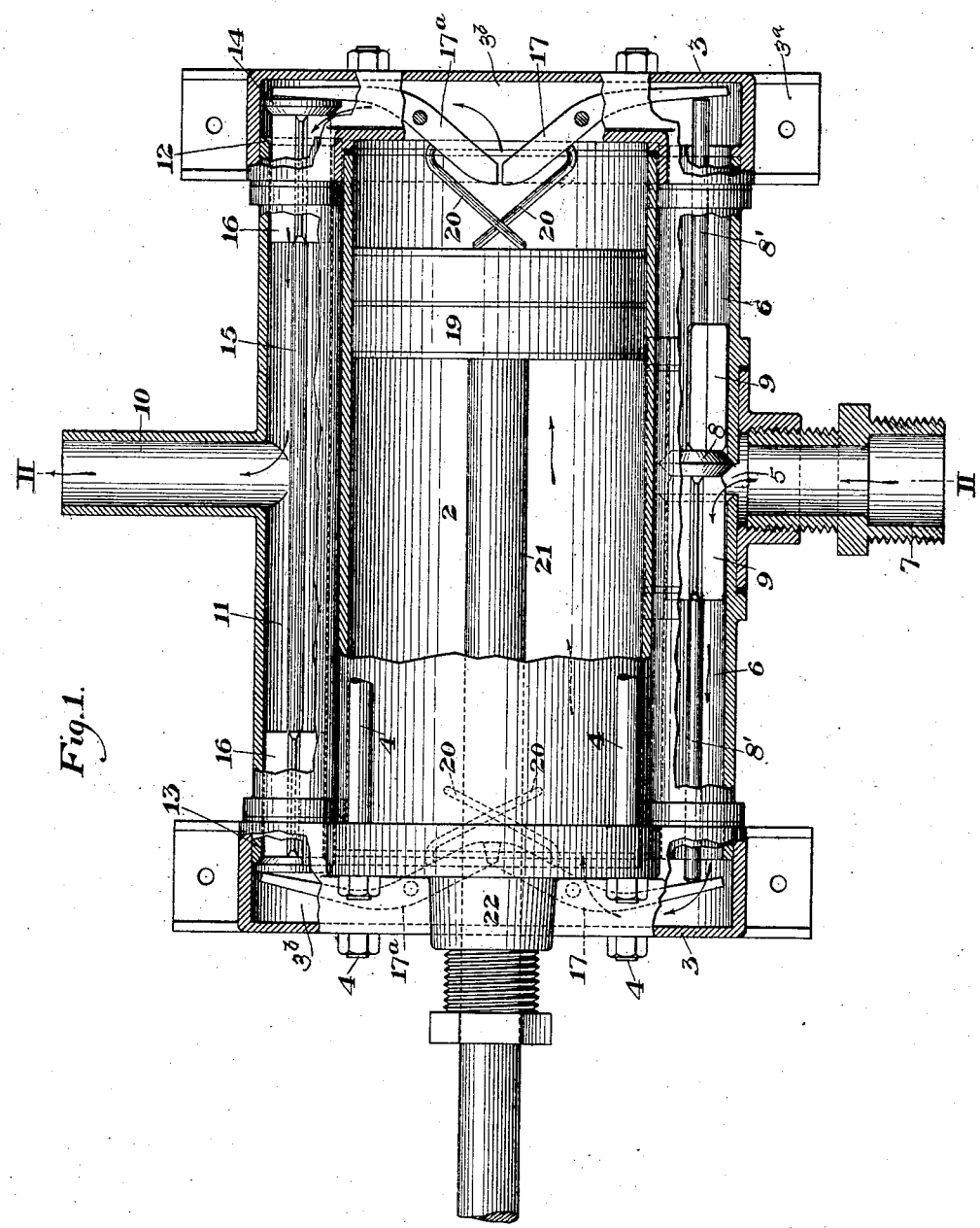

No. 880,298. PATENTED FEB. 25, 1908.
O. F. GRANT & J. G. McDOWELL.
HYDRAULIC MOTOR.
APPLICATION FILED OCT. 9, 1905.

2 SHEETS—SHEET 1.

WITNESSES
Warren W. Swartz
R A Balderson

INVENTORS
Oscar F. Grant
John G. McDowell
by Bakewell & Byrnes
their attys

No. 880,298. PATENTED FEB. 25, 1908.
O. F. GRANT & J. G. McDOWELL.
HYDRAULIC MOTOR.
APPLICATION FILED OCT. 9, 1905.
2 SHEETS—SHEET 2.
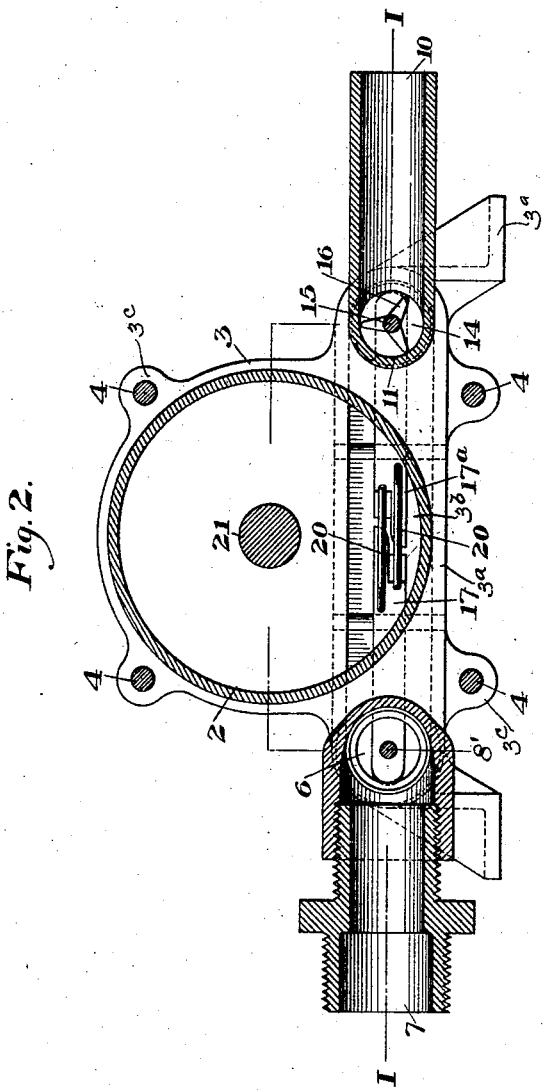
WITNESSES
INVENTORS

UNITED STATES PATENT OFFICE.

OSCAR F. GRANT AND JOHN G. McDOWELL, OF PITTSBURG, PENNSYLVANIA.

HYDRAULIC MOTOR.

No. 880,298.      Specification of Letters Patent.      Patented Feb. 25, 1908.

Application filed October 9, 1905. Serial No. 281,898.

*To all whom it may concern:*

Be it known that we, OSCAR F. GRANT and JOHN G. McDOWELL, both of Pittsburg, Allegheny county, Pennsylvania, have invented a new and useful Improvement in Hydraulic Motors, of which the following is a full, clear, and exact description, reference being had to the accompanying drawings, forming part of this specification, in which—

Figure 1 is an irregular horizontal section on the line I—I of Fig. 2; and Fig. 2 is a transverse section on the line II—II of Fig. 1.

The object of our invention is to provide a hydraulic motor of simple, compact and inexpensive construction, which can be operated efficiently by connection with any suitable water service or supply pipe, and which may be conveniently used for operating various small machines, such as washing machines, ice cream freezers, etc.

In carrying out our invention, we provide a cylinder having a reciprocating piston therein, together with inlet and outlet valves arranged to be operated by the piston and provided with means whereby the full throw of each valve when shifted is insured.

Our invention also consists in the novel construction, arrangement and combination of the parts, all substantially as hereinafter described and pointed out in the appending claims.

In the drawings, the numeral 2 designates an open ended cylinder.

3, 3 designate heads which close the ends of the cylinders, and which contain chambers 3$^b$. These heads have formed thereunder the integral base portions 3$^a$ upon which the motor is supported; and the two heads are rigidly connected by the rods 4 whose ends are secured in the projecting lugs 3$^c$ of the cylinder heads.

5 is the water inlet port communicating with the water inlet passage 6, and provided with a suitable coupling 7 for connection with the hose or other water supply pipe. The ends of the inlet passage 6 communicate with the respective ends of the cylinder through the heads 3. The inlet port 5 is controlled by a valve 8 secured to a longitudinally extending valve rod 8', whose end portions extend into the chambers of the heads 3. Said rod is provided with guides 9, which maintain it centrally within the passage 6.

10 is the outlet or escape, which opens outwardly from the longitudinally extending outlet passage 11, which also communicates with the cylinder at each end, through the outlet ports 12 and 13 respectively. These ports 12 and 13 are respectively controlled by the valves 14, on opposite end portions of the valve rod 15 which extends through the passage 11 and has the centralizing guides 16.

Pivotally mounted within each of the heads 3 are two levers 17, 17$^a$. Each lever 17 has one arm extending into position to be engaged by the ends of the valve rod 8', while its other arm projects slightly within the end portion of the cylinder 2 in a position to be engaged by the piston 19. Each of the levers 17$^a$ has one of its arms extended into position to be engaged by a valve 14 and its other arm extended within the end portion of the cylinder in the same manner as the corresponding arms of the lever 17.

20 designates springs, one of which is secured to each lever 17, 17$^a$ with its free portion extending a short distance within the end portion of the cylinder, so that it will be engaged by the piston 19 a short time before the latter reaches the end of its stroke and before it contacts with the inwardly extending arms of the said levers. These springs are conveniently formed of spring wire so arranged that the free arms of the two springs at each end of the cylinder will cross each other in the manner shown in Fig. 1.

The inlet passage 6 and the outlet passage 11 are conveniently formed by pieces of pipe, whose ends are secured in the heads 3 by being fitted in seats or openings formed to receive the same. These pipes are located at the bases of the cylinder, at opposite sides thereof, and assist in forming the base or support for the motor.

21 designates the piston rod working through the stuffing box 22, and to which the machine to be driven by the motor may be connected in any suitable manner.

The operation of the motor is as follows:—Supposing the piston 19 to be moving in the direction of the arrow, water enters the cylinder from the port 5 through the left-hand end portion of the passage 6, the escape from the opposite side of the piston being by way of the port 12 and the right-hand end portion of the outlet passage 11, as indicated by the arrows. As the piston approaches the end of its stroke, it first contacts with the free arms of the spring 20 and compresses the springs until the piston makes contact with the inwardly extending arms of the levers 17, 17ª. When the last mentioned contact takes place, said levers are moved to actuate the valve rods 8' and 15, so that the valve 8 is shifted to the opposite side of the port 5, the port 12 is closed by one of the valves 14, and the other valve 14 is moved to open the port 13, thus providing for the admission of water to the right-hand end of the cylinder and escape from the left-hand end. Owing to the degree of compression given the springs 20 before the levers 17, 17ª are operated by the piston there is imparted to the valve rods a quick operating movement, of such character as to make certain that the valves 5 and 14 will be positively and fully shifted. Without these springs, owing to the pressure of water against the valves to resist their shifting movement, the valves would remain in central relation to their respective ports, which would, of course, prevent the operation of the motor. This is entirely prevented by the springs 20, as their impulse is sufficient to throw the valves past their centers.

The construction and arrangement described is a very simple and compact one, and inasmuch as the cylinder and the inlet and outlet passages may be formed from pieces of ordinary pipe secured between the heads 3, the motor may be constructed very cheaply.

While we prefer the arrangement of springs 20 herein shown and described, it is obvious that other forms of springs may be used, and that other changes may be made in the details of construction and arrangement without departing from our invention.

What we claim is:—

1. A hydraulic motor having a cylinder, a piston arranged to reciprocate therein, an admission valve having two admission positions, an outlet valve at each end portion of the cylinder, levers arranged to operate said valves, and operated by the piston at the ends of its stroke, and springs intermediate of the piston and said levers and arranged to be compressed by the piston prior to the operation of said levers, the said outlet valves being connected so as to be operated simultaneously but in reverse directions; substantially as described.

2. In a hydraulic motor, a cylinder having an inlet port leading to each end thereof, a piston arranged to reciprocate in the cylinder, an admission valve arranged to control said ports and having a valve rod extending from both directions, levers engaging the said rods and lying partially within the cylinder for contact with the piston, springs intermediate of the levers and piston, said cylinder also having two outlet ports, connected valves for controlling said ports, and lever and spring mechanism actuated by the piston at each end portion of the stroke for simultaneously actuating said outlet valves; substantially as described.

3. In a hydraulic motor, the combination with a cylinder, a piston therein and an inlet port and valve, of outlet ports at the rerpective end portions of the cylinder, valves for the said ports, a rod connecting the valves, levers engaging the said valves and lying partially within the cylinder, and springs carried by the said levers and arranged to be engaged by the piston; substantially as described.

4. In a hydraulic motor, the combination with a cylinder, and a piston arranged to reciprocate therein, of an inlet passage at one side of the said cylinder and communicating with both end portions thereof, an outlet passage at the opposite side of said cylinder, and also communicating with both end portions thereof, valves for controlling the said inlet and outlet passages, the outlet valves being connected one with the other levers arranged to operate said valves, and springs arranged to act upon said levers and lying within the end portions of the cylinder; substantially as described.

5. In a hydraulic motor, the combination of a cylinder, a piston therein, and inlet and outlet ports for said cylinder, of valves for the said ports, levers pivoted within the cylinder heads, and arranged to operate the said valves, said levers having portions extending within the cylinder, and springs attached to said levers and arranged to be compressed by the piston before the latter engages said levers the outlet valves being connected to be simultaneously operated at both ends of the piston stroke; substantially as described.

6. In a hydraulic motor, the combination with a cylinder, of a piston therein, and an inlet port and valve, of outlet ports at the respective end portions of the cylinder, valves for the said ports, a rod connecting the said valves, levers engaging the said valves, and lying partially within the cylinder, and springs arranged to be compressed by the piston at the end portions of the stroke and to act upon said levers when compressed; substantially as described.

7. In a reciprocating motor, a cylinder having chambered heads provided with inlet ports, a single valve controlling said ports, levers pivoted in the said heads and arranged to actuate said valve, and springs on the levers arranged to be actuated directly by the piston of the motor; substantially as described.

8. In a water motor, a cylinder having a piston and inclosing heads, said heads having chambers opening into the cylinder, inlet and outlet tubes connecting the said chambers and lying outside of and parallel with the cylinder, an outlet valve for each end of the outlet tube and arranged to seat against the ends of the same, said valves being connected by a rod or stem extending through the said tube, an inlet valve seated within the other tube and having a seating position at each side of an inlet connection, said valve having stems extending in opposite directions into the chambers of the heads, valve operating levers within each of the said chambers in position to be engaged by the piston and arranged to engage the outlet valves and the stems of the inlet valve, and springs for said levers arranged to impart the final movement thereto; substantially as described.

9. In a reciprocating motor, a cylinder, a piston, chambered heads closing the ends of the cylinder, inlet and outlet tubes connecting the said heads at the base of the cylinder and upon opposite sides thereof, rigidly connected outlet valves arranged to alternately open and close the ends of the outlet tube, an inlet valve in the inlet tube and having seating positions at each side of an inlet opening thereof, levers in the chambers of the heads for actuating the three valves and arranged to be engaged by the piston, and springs intermediate the piston and levers; substantially as described.

10. A hydraulic motor having a cylinder, a piston arranged to reciprocate therein, an admission valve having two admission positions, an outlet valve for each end portion of the cylinder, levers arranged to operate said valves, and operated by the piston at the ends of its stroke, and springs intermediate of the piston and said levers and arranged to be compressed by the piston prior to the operation of said levers, the said outlet valves being connected so as to be operated simultaneously but in reverse directions.

11. In a water motor, the combination, with a cylinder, a piston working in said cylinder, caps at the ends of said casing, inlet and outlet chambers for said cylinder extending substantially the full length thereof, valve rods slidably mounted in said chambers and extending beyond both ends of said chambers into said caps, valve seats for said chambers, valve members carried by said rods, and means located within said caps for operating said rods, said operating means being controlled by the movement of the piston.

In testimony whereof, we have hereunto set our hands.

OSCAR F. GRANT,
JOHN G. McDOWELL.

Witnesses:
 GEO. B. BLEMING,
 GEO. H. PARMELEE.